US009674487B2

(12) United States Patent
Yoshida

(10) Patent No.: US 9,674,487 B2
(45) Date of Patent: Jun. 6, 2017

(54) TRANSMISSION SYSTEM, RELAY APPARATUS, TRANSMISSION TERMINAL, AND TRANSMISSION TERMINAL CONTROL PROGRAM

(71) Applicant: Kumiko Yoshida, Tokyo (JP)

(72) Inventor: Kumiko Yoshida, Tokyo (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 14/437,992

(22) PCT Filed: Oct. 29, 2013

(86) PCT No.: PCT/JP2013/079804
§ 371 (c)(1),
(2) Date: Apr. 23, 2015

(87) PCT Pub. No.: WO2014/069650
PCT Pub. Date: May 8, 2014

(65) Prior Publication Data
US 2015/0281646 A1 Oct. 1, 2015

(30) Foreign Application Priority Data
Oct. 31, 2012 (JP) ................... 2012-240242

(51) Int. Cl.
*H04N 7/15* (2006.01)
*H04L 12/18* (2006.01)
(Continued)

(52) U.S. Cl.
CPC ......... *H04N 7/152* (2013.01); *H04L 12/1818* (2013.01); *H04M 3/22* (2013.01);
(Continued)

(58) Field of Classification Search
CPC .......... H04N 7/15; H04N 7/152; H04N 7/155; H04N 7/14; H04L 12/1818; H04M 3/22; H04M 3/567; H04M 2203/055
(Continued)

(56) References Cited

U.S. PATENT DOCUMENTS 4,691,336 A * 9/1987 Durston .................. H04M 3/30
379/21
5,966,427 A 10/1999 Shaffer et al.
(Continued)

FOREIGN PATENT DOCUMENTS

JP 48-71124 9/1973
JP H07-162825 6/1995
(Continued)

OTHER PUBLICATIONS

International Search Report Issued on Jan. 21, 2014 in PCT/JP2013/079804 filed on Oct. 29, 2013.
(Continued)

*Primary Examiner* — Stella Woo
(74) *Attorney, Agent, or Firm* — Oblon, McClelland, Maier & Neustadt, L.L.P.

(57) ABSTRACT

A transmission system includes a transmission terminal locally reproducing video and voice data and transmitting and receiving the video and voice data via a network; a relay apparatus transmitting the video data and voice data to another transmission terminal or the transmission terminal; and a transmission management apparatus managing a session for a single transmission terminal. Further, the transmission terminal sends a request for establishing a session for a single site to the relay apparatus via the transmission management apparatus, and the relay apparatus establishes the session for the single site related to the transmission
(Continued)

terminal so that a connection check process is performed on the transmission terminal within the single site only.

7 Claims, 14 Drawing Sheets

(51) Int. Cl.
*H04M 3/22* (2006.01)
*H04M 3/56* (2006.01)

(52) U.S. Cl.
CPC ............ *H04M 3/567* (2013.01); *H04N 7/155* (2013.01); *H04M 2203/055* (2013.01)

(58) Field of Classification Search
USPC .................... 348/14.01–14.16; 370/260–271; 379/1.01–35
See application file for complete search history.

(56) References Cited

U.S. PATENT DOCUMENTS

| | | | |
|---|---|---|---|
| 5,996,094 A | 11/1999 | Ito | |
| 8,237,764 B1* | 8/2012 | Chen | .................. H04L 12/1827 348/14.01 |
| 2007/0258700 A1 | 11/2007 | Ivashin et al. | |
| 2007/0291108 A1* | 12/2007 | Huber | ...................... H04N 7/15 348/14.02 |
| 2011/0182185 A1 | 7/2011 | Vigoureux et al. | |
| 2012/0128134 A1 | 5/2012 | Pappas et al. | |
| 2012/0221702 A1 | 8/2012 | Umehara et al. | |
| 2013/0301809 A1* | 11/2013 | Dunne | .................... H04L 65/80 379/32.01 |
| 2014/0055555 A1* | 2/2014 | Imai | .................... H04L 63/0428 348/14.09 |
| 2014/0146123 A1* | 5/2014 | Kumazawa | ........ H04N 21/4223 348/14.02 |

FOREIGN PATENT DOCUMENTS

| | | |
|---|---|---|
| JP | H10-191297 | 7/1998 |
| JP | 2006-157633 | 6/2006 |
| JP | 2008-271226 A | 11/2008 |
| JP | 2011-44776 | 3/2011 |
| JP | 2011-193374 | 9/2011 |
| JP | 2012-191598 | 10/2012 |
| WO | WO2010/023511 | 3/2010 |

OTHER PUBLICATIONS

Extended European Search Report issued Nov. 10, 2015 in Patent Application No. 13852282.6.
K. Hedayat, et al., "An Extension to the Session Description Protocol (SDP) for Media Loopback; draft-ietf-mmusic-media-loopback-10" Internet Engineering Task Force, XP015061075, Feb. 2009, 35 Pages.
Office Action issued in Japanese Patent Application No. JP 2012-240242 issued May 31, 2016.

* cited by examiner

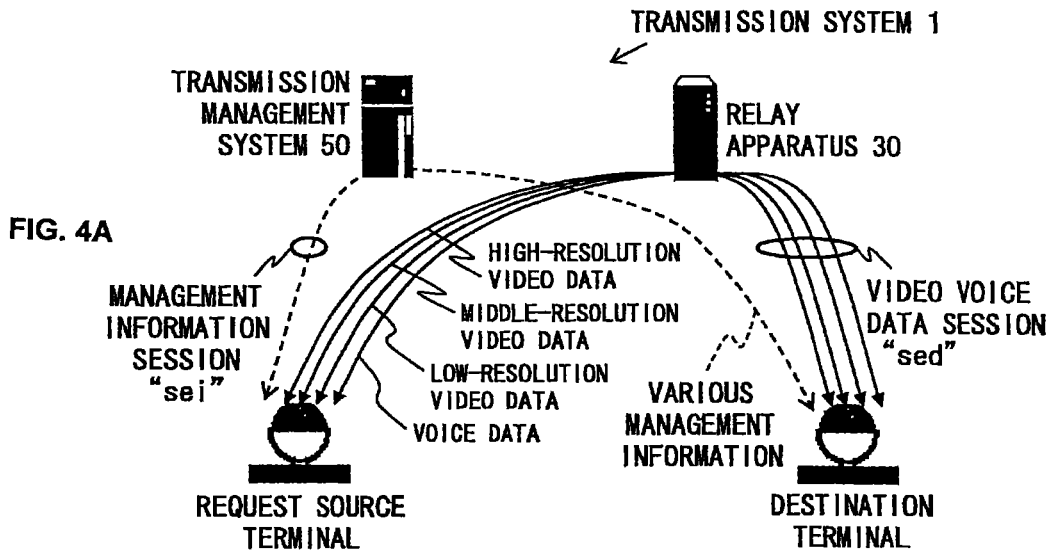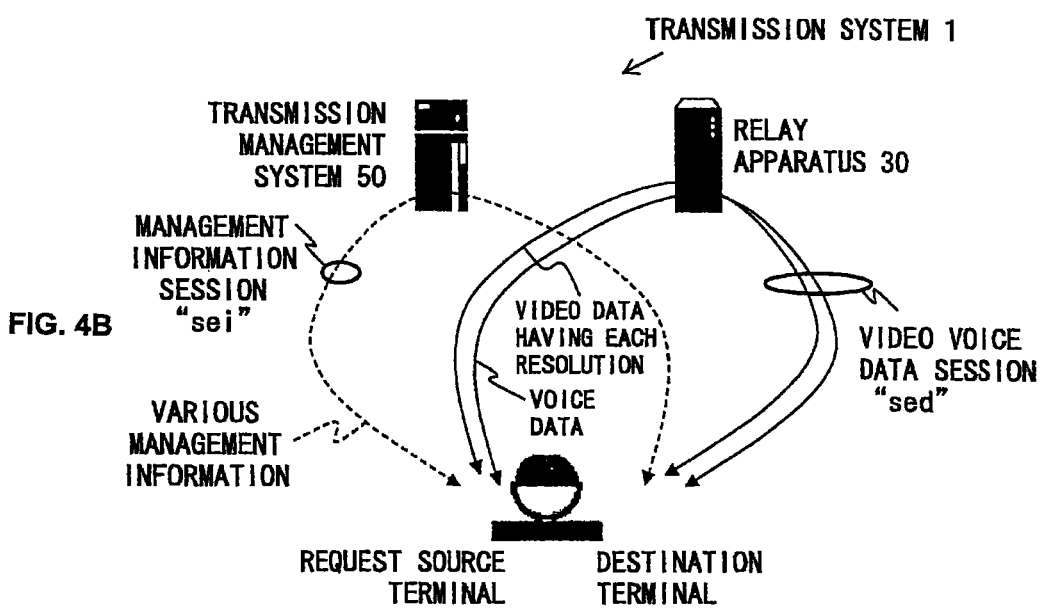

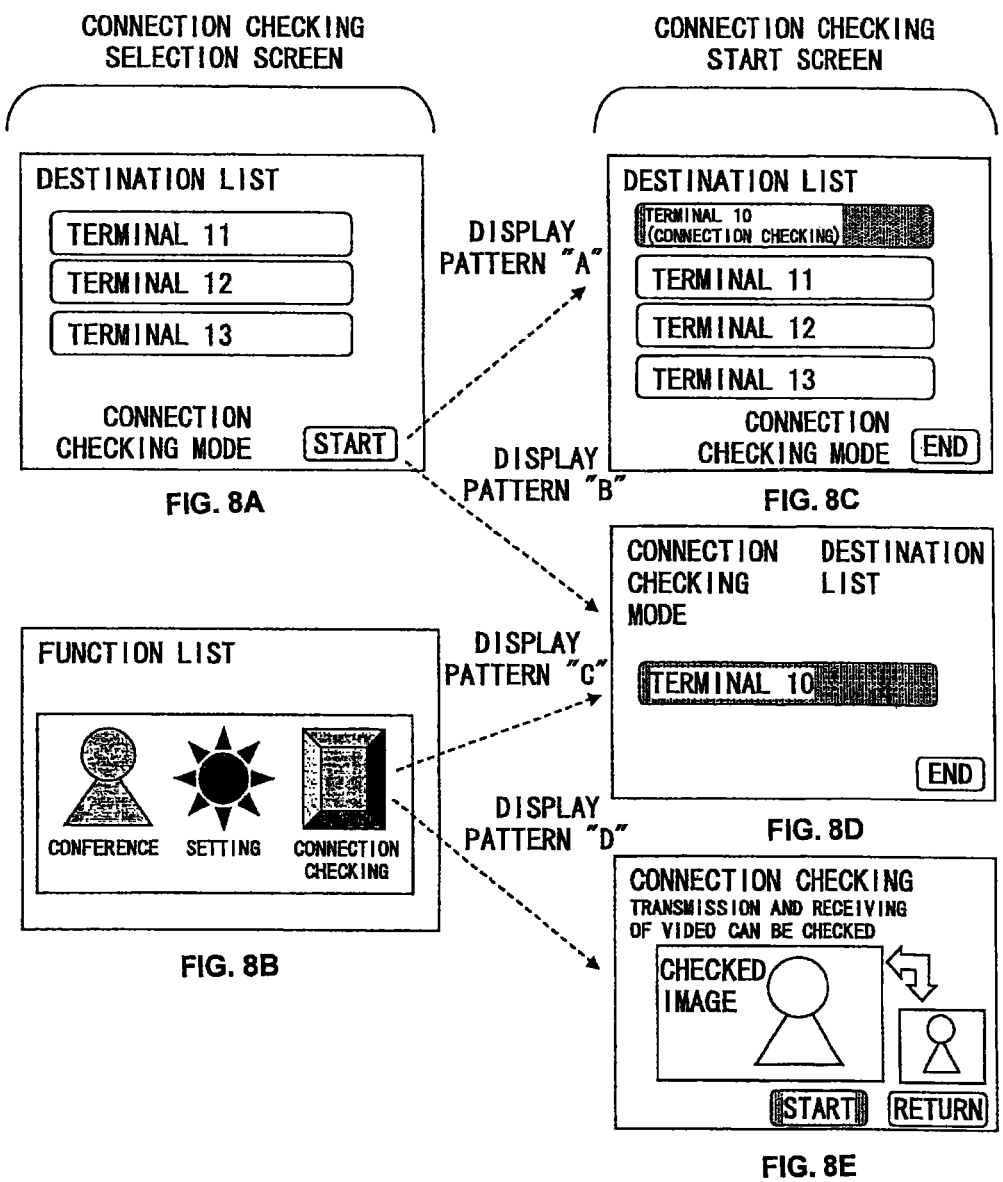

FIG. 9A
NORMAL DESTINATION LIST TABLE

| REQUEST SOURCE TERMINAL ID | DESTINATION TERMINAL ID |
|---|---|
| 01aa | 01ab,01ca,01cb |
| 01ab | 01aa,01ca,01cb,··· |
| ··· | ··· |

FIG. 9B
CONNECTION CHECKING DEDICATED TABLE

| REQUEST SOURCE TERMINAL ID | DESTINATION TERMINAL ID |
|---|---|
| 01aa | 01aa |
| 01ab | 01ab |
| ··· | ··· |

FIG. 9C
CONNECTION CHECKING TERMINAL ID ADDED TABLE

| REQUEST SOURCE TERMINAL ID | DESTINATION TERMINAL ID |
|---|---|
| 01aa | 01aa,01ab,01ca,01cb |
| 01ab | 01ab, 01aa,01ca,01cb,··· |
| ··· | ··· |

FIG. 9D
COMBINED-TYPE TABLE

| REQUEST SOURCE TERMINAL ID | DESTINATION TERMINAL ID | CONNECTION CHECKING DESTINATION TERMINAL ID |
|---|---|---|
| 01aa | 01ab,01ca,01cb | 01aa |

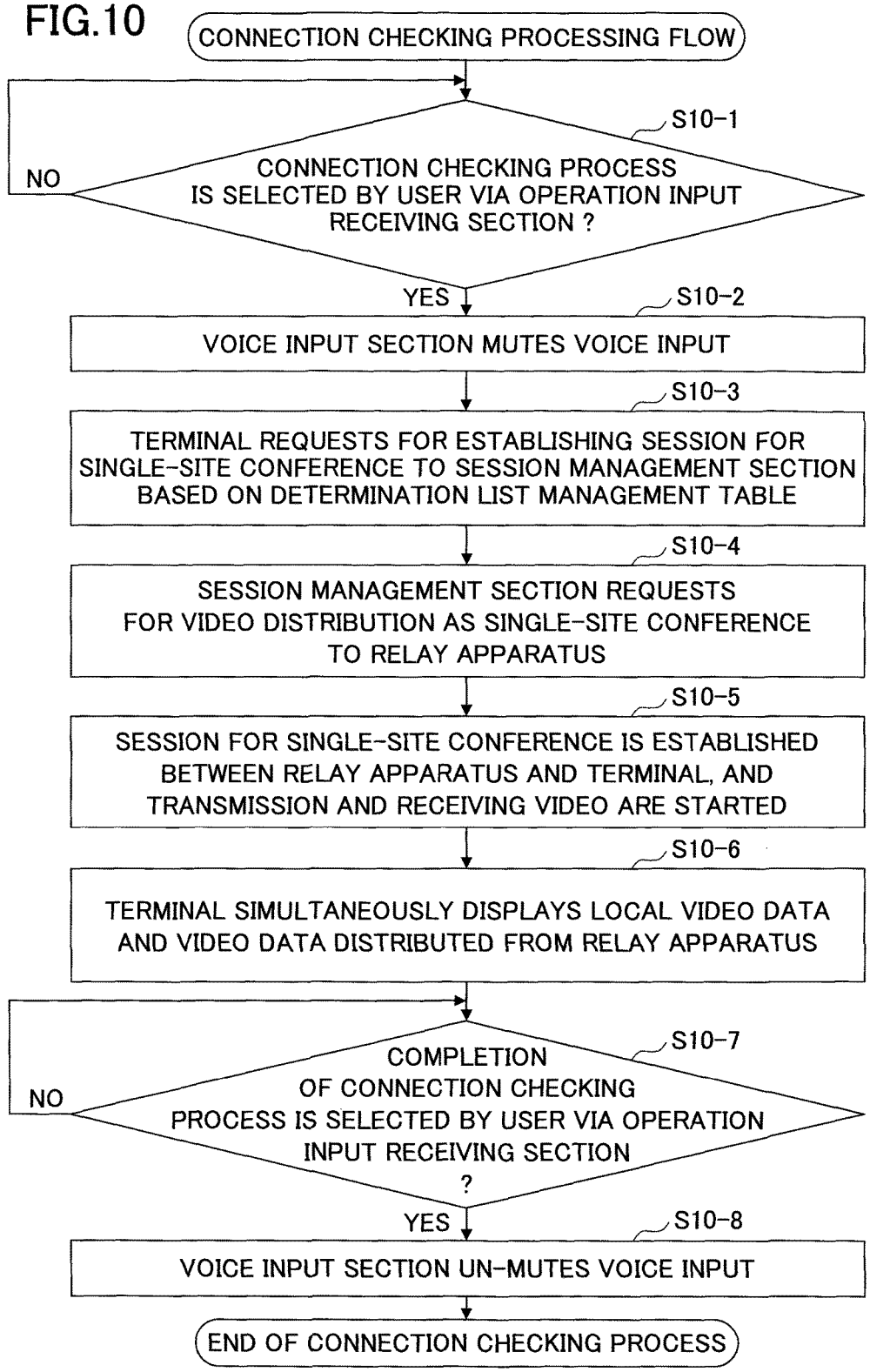

TRANSMISSION SYSTEM, RELAY APPARATUS, TRANSMISSION TERMINAL, AND TRANSMISSION TERMINAL CONTROL PROGRAM

TECHNICAL FIELD

The present invention relates to a technique for transmitting video and voice data.

BACKGROUND ART

In a remote conference system, which is one form of a transmission system, a state similar to that in an actual meeting can be realized by collecting video and voice captured by using transmission terminals for the attendees in a conference room where the attendees participate in the remote conference, converting the video and voice data into digital data, and transmitting the digital data to the transmission terminal of other attendees, so that the video data are displayed on displays and the voice data are output from speakers in other conference rooms where the other attendees participate in the same remote conference.

In such a remote conference system, a remote conference held between multiple locations is realized by connecting all the transmission terminals participating in the conference to a server distributing the video data, so that the server distributing the video data can control the distributions of the video data and the voice data to the transmission terminals.

This type of remote conference system may be expected to operate normally, but a failure may occur due to various causes.

Patent Document 1 discloses a remote maintenance apparatus that includes a failure detection unit detecting a failure in predetermined elements in a television conference system and a notice transmitting unit giving a notice of the detected failure information which satisfies a predetermined condition to a designated notice destination.

According to this apparatus, a notice of the failure contents are given to the designated notice destination such as a section in charge of maintenance.

DISCLOSURE OF THE INVENTION

Problems to be Solved by the Invention

The technique described in Patent Document 1 may be applied to a failure after the use of the transmission terminals is started, but it is difficult to check whether the remote conference can be correctly used while the transmission terminals are being installed.

Usually, when such transmission terminals are purchased, the user or a person in charge of service installs the transmission terminals and performs testing to determine whether the remote conference can be performed with the transmission terminals to make sure that there is no failure.

However, to perform the test to make sure that the remote conference can be conducted with the transmission terminals, it is necessary to prepare at least another transmission terminal that serves as that at the other end. However, it is troublesome to locate such transmission terminal to serve as that at the other end make an appointment with a person who manages the transmission terminal at the other end so that the person can cooperate for the test.

The present invention is made in light of the above problem and may make it possible to perform a connection check in a wide range including transmission paths and a network bandwidth with a single transmission apparatus.

Means for Solving the Problems

In order to solve the above problem, according to an aspect of the present invention, a transmission system includes a transmission terminal locally reproducing video data and voice data and transmitting and receiving the video data and voice data via a network; a relay apparatus transmitting the video data and the voice data transmitted from the transmission terminal to another transmission terminal or the transmission terminal that has transmitted the video data and voice data; and a transmission management apparatus managing a session for a plurality of transmission terminals or a single transmission terminal. Further, the transmission terminal sends a request for establishing a session for a single site to the relay apparatus via the transmission management apparatus, and the relay apparatus establishes the session for the single site related to the transmission terminal in response to the request from the transmission terminal as a request source so that a connection check process is performed on the transmission terminal within the single site only.

Effects of the Present Invention

According to the present invention, it may become possible to perform a connection check in a wide range including transmission paths and a network bandwidth with a single transmission apparatus.

BRIEF DESCRIPTION OF THE DRAWINGS

FIGS. 4A, 4B are conceptual diagram diagrams showing a transmission and receiving state of image data, voice data, and various management information in the transmission system;

FIGS. 8A-8E are drawings showing example screens for operations when the connection checking process is started;

FIGS. 9A-9D are drawings showing examples of a destination list management table to be used when the connection checking process is started;

FIG. 10 is a flowchart showing an example connection checking process according to a second embodiment;

BEST MODE FOR CARRYING OUT THE INVENTION

In the following, preferred embodiments of the present invention are described.
Configuration FIG. 1 shows an example configuration of a transmission system 1.

Figure 1:
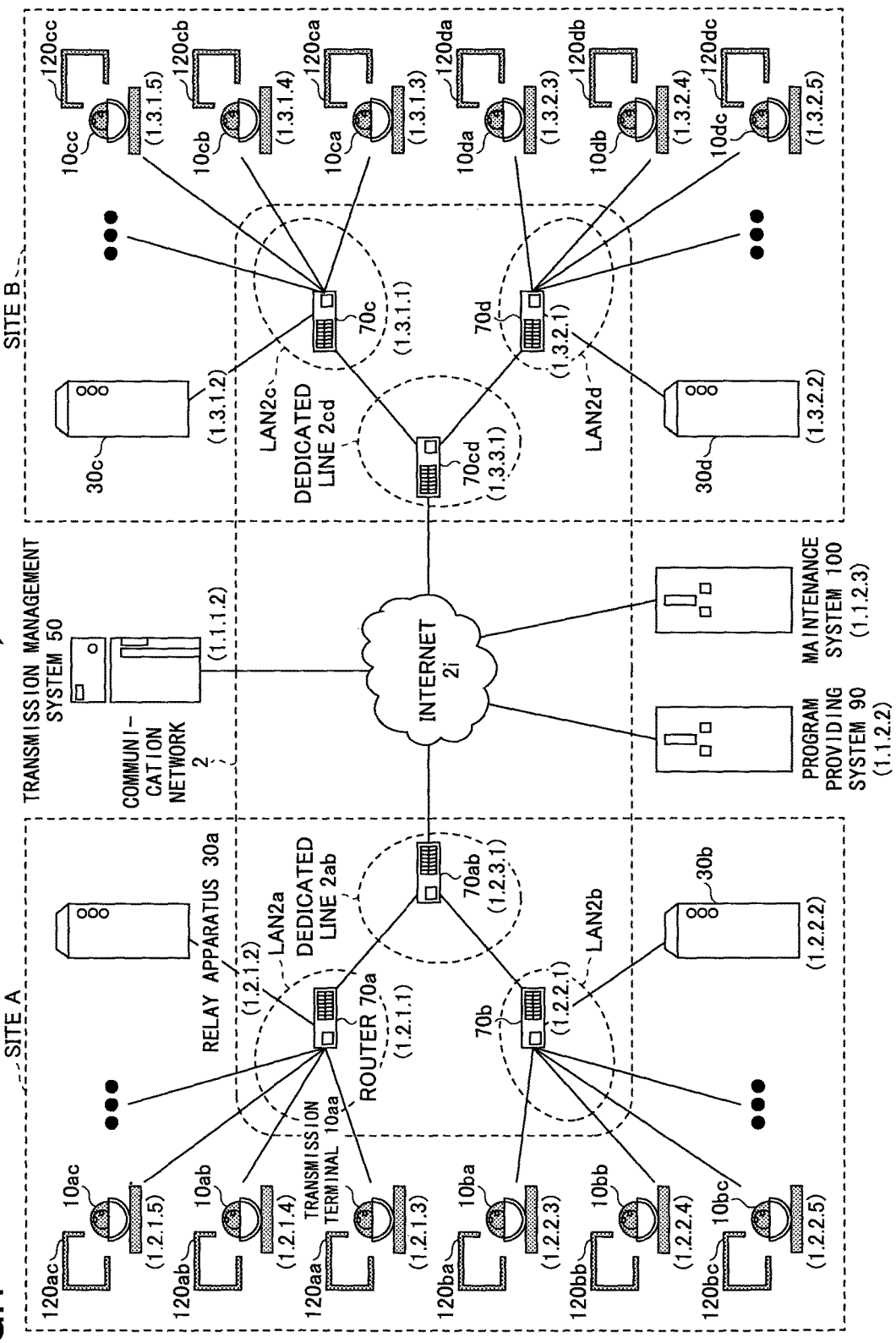
FIG. 1 is a drawing showing an example configuration of a transmission system.

In FIG. 1, the transmission system 1 includes a plurality of transmission terminals 10 (10aa, 10ab, . . . ), display devices 120 (120aa, 120ab, . . . ) of the respective transmission terminals 10 (10aa, 10ab, . . . ), a plurality of relay apparatuses 30 (30a, 30b, 30c, and 30d), a transmission management system 50, a program providing system 90, and a maintenance system 100.

The transmission system 1 may transmit and receive image data based on an video coding standard such as H.264/SVC (Scalable Video Coding). Further, a management information session for transmitting and receiving various management information is established via the transmission management system 50, so that the video data and voice data are transmitted and received among the transmission terminals 10 via the relay apparatuses 30. Here, the video coding standard is not limited to H.264/SVC. Namely, any of the known video coding standards may be used. As another example, H.264/AVC may also be used.

The program providing system 90 includes a storage device such as an HD (Hard Disk) so as to store a terminal program to realize various functions in the transmission terminals 10 (or cause the transmission terminals 10 to function as various means), and can transmit the terminal program to the transmission terminals 10. Further, the program providing system 90 stores a relay-apparatus program to cause the relay apparatuses 30 to realize various functions (or cause the relay apparatuses 30 to function as various means), and can transmit the relay-apparatus program to the relay apparatuses 30. Further, the program providing system 90 stores a maintenance program for the transmission terminals 10 and can transmit the maintenance program to the transmission terminals 10.

Figure 2:
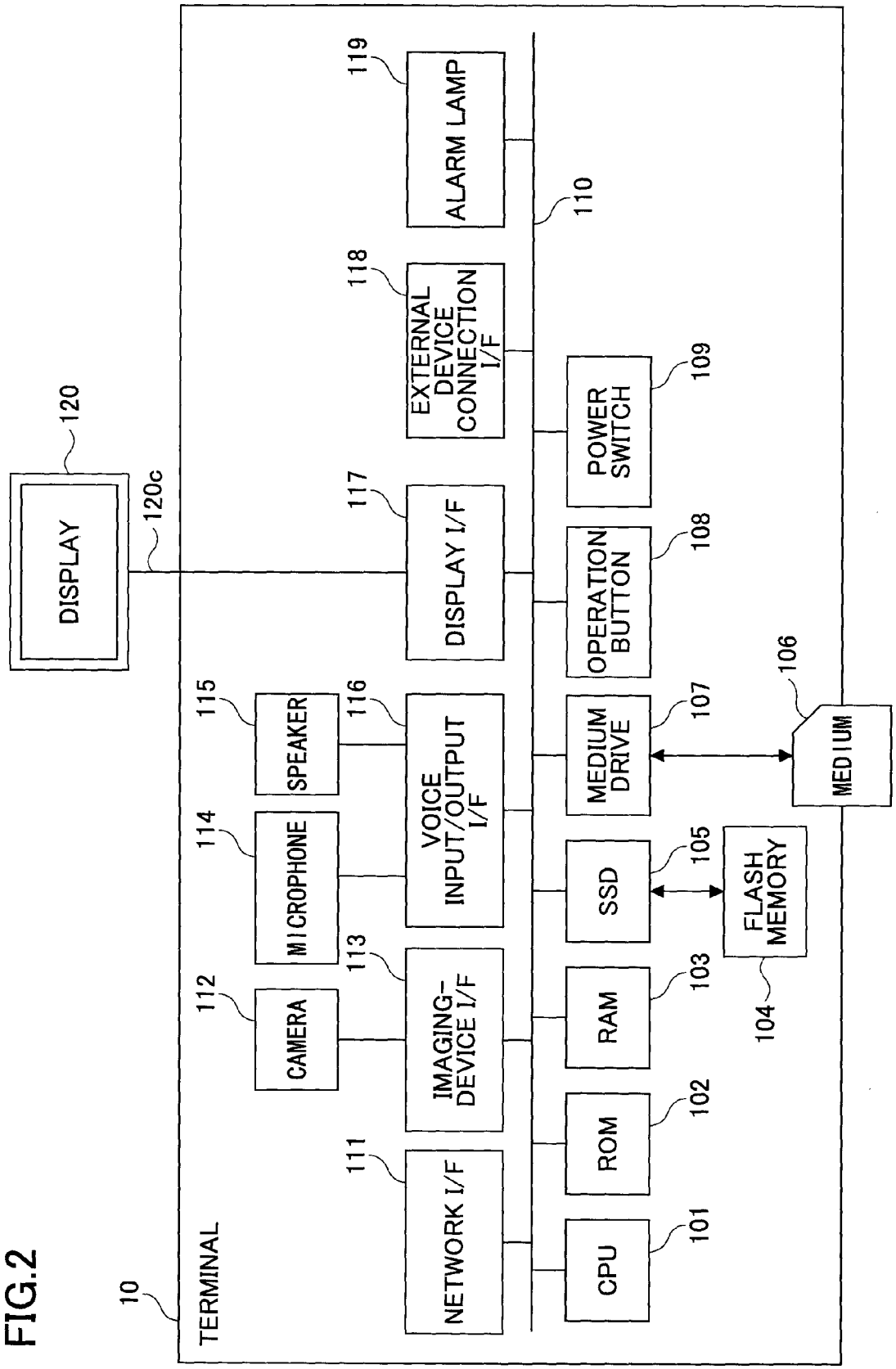
FIG. 2 is a drawing showing an example hardware configuration of a transmission terminal.

FIG. 2 shows an example hardware configuration of the transmission terminal 10.

The transmission terminal 10 includes a CPU (Central Processing Unit) 101 controlling overall operations of the transmission terminal 10, a ROM (Read Only Memory) 102 storing a program to drive the CPU 101 in IPL (Initial Program Loader) and the like, a RAM (Random Access Memory) 103 to be used as a working area for the CPU 101, a flash memory 104 storing the terminal program and various data such as the video data and voice data, and an SSD (Solid State Drive) 105 controlling reading and writing of the various data from and in the flash memory 104.

Further, the transmission terminal 10 includes a medium drive 107 controlling reading and writing (storing) data from and in a recording medium 106 such as a flash memory.

Further, the transmission terminal 10 includes an operation button 108 to be operated to, for example, select a data destination of the transmission terminal 10, a power switch 109 to switch on and off the power of the transmission terminal 10, and a network I/F (Interface) 111 to perform data transmission via a communication network 2.

Further, the transmission terminal 10 includes a built-in camera 112 capturing images of an object and acquiring video data thereof, an imaging-device I/F 113 controlling the drive of the camera 112, a built-in microphone 114 inputting voice sound (hereinafter may be simplified as "voice"), a built-in speaker 115 outputting voice, and a voice input/output I/F 116 performing input/output processes on voice signals for the microphone 114 and the speaker 115 in accordance with the control by the CPU 101. The camera 112 includes a lens and a solid-state image sensing device converting light into charges and digitizing the video (images) of the object. As the solid-state image sensing device, a CMOS (Complementary Metal Oxide Semiconductor), a CCD (Charge Coupled Device) or the like may be used.

Further, the transmission terminal 10 includes a display I/F 117 transmitting video data to an external display 120 in accordance with the control of the CPU 101. The display 120 is a display part that displays video of the object and icons for operations and is made of a liquid crystal or an organic EL (electroluminescence) material. Further, the display 120 is connected to the display I/F 117 with a cable 120c. The cable 120c may be an analog RGB (VGA) signal cable, a component video cable, an HDMI (High-Definition Multimedia Interface) signal cable or a DVI (Digital Video Interactive) signal cable.

Further, the transmission terminal 10 includes an external device connection I/F 118 for connecting various external devices, an alarm lamp 119 indicating abnormal states of various devices, and a bus line 110 including an address bus and a data bus for electrically connecting to the above elements. By connecting a USB (Universal Serial Bus) cable or the like to the external device connection I/F 118, an external device such as an external camera, an external microphone, and an external speaker can be electrically connected. When the external camera is connected, the external camera is operated (driven) in preference to the built-in camera 112 in accordance with the control by the CPU 101. In the same manner, when the external microphone or the external speaker is connected, the external microphone or the external speaker is operated in preference to the built-in microphone 114 or the built-in speaker 115 in accordance with the control by the CPU 101.

Further, the transmission terminal 10 may be a PC (Personal Computer), a smartphone, a tablet terminal, or a mobile phone. Further, it is not always necessary for the transmission terminal 10 to have the built-in camera, microphone, and speaker. Namely, the transmission terminal 10 may use only an external camera, an external microphone, and an external speaker.

Figure 3:
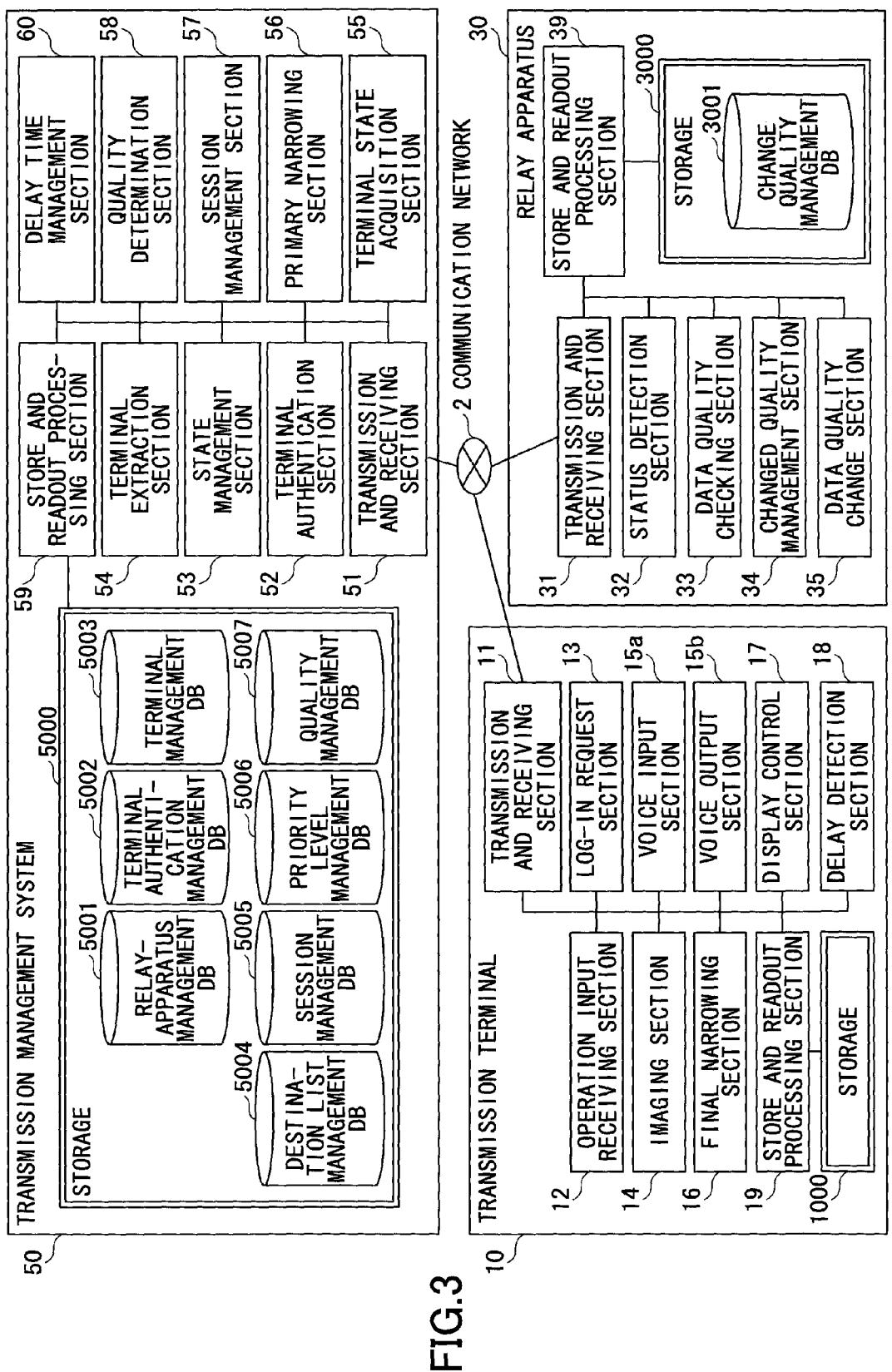
FIG. 3 is a drawing showing an example functional configuration of a main apparatus.

FIG. 3 shows an example functional configuration of main apparatuses.

In FIG. 3, the transmission terminal 10 includes a transmission and receiving section 11, an operation input receiving section 12, a log-in request section 13, an imaging section 14, a voice input section 15a, a voice output section 15b, a final narrowing section 16, a display control section 17, a delay detection section 18, a store and readout processing section 19, and a storage 1000.

The transmission and receiving section 11 is realized by the network I/F (Interface) 111 in FIG. 2 and performs transmission and receiving various data (information) with another terminal, an apparatus, and a system via the communication network 2.

The operation input receiving section 12 is realized by the operation button 108 and the power switch 109 in FIG. 2 and receives various inputs by a user.

The log-in request section 13 is realized by the CPU 101 in FIG. 2 and upon being triggered by receiving the power-on state, automatically transmits log-in request information, which indicates a log-in request, and the IP address of the transmission terminal 10 (request source terminal) at this time point from the transmission and receiving section 11 to the transmission management system 50 via the communication network 2.

The imaging section 14 is realized by the camera 112 and the imaging-device I/F 113 in FIG. 2, captures video (images) of the object by the camera 112 and outputs the video data acquired based, on the captured video.

The voice input section 15a is realized by the microphone 114 and the voice input/output I/F 116 in FIG. 2 and, after the voice of a user is converted into a voice signal by the microphone 114, inputs the voice data related to the voice signal.

The voice output section 15b is realized by the voice input/output I/F 116 and the speaker 115, and outputs a voice signal related to the voice data to the speaker 115 to output the voice.

The final narrowing section 16 performs a final narrowing process that finally selects one relay apparatus 30 that is to relay image data and voice data in the conversations in the remote conference from a plurality of the relay apparatuses 30.

The display control section 17 is realized by the display I/F 117 in FIG. 2, and controls the transmission of the video data to the external display 120.

The delay detection section 18 is realized by the CPU 101 in FIG. 2, and detects a delay time (ms) of the video data or the voice data transmitted from another transmission terminal 10 via the relay apparatuses 30.

The store and readout processing section 19 is realized by the SSD 105 or the like in FIG. 2, and performs a storing process to store various data in the storage 1000 using the flash memory 104 and a readout process to read out various data stored in the storage 1000.

The transmission management system 50 includes a transmission and receiving section 51, a terminal authentication section 52, a state management section 53, a terminal extraction section 54, a terminal state acquisition section 55, a primary narrowing section 56, a session management section 57, a quality determination section 58, a store and readout processing section 59, a delay time management section 60, and a storage 5000. The storage 5000 includes a relay-apparatus management DB (Data Base) 5001, a terminal authentication management DB 5002, a terminal management DB 5003, a destination list management DB 5004, a session management DB 5005, a priority level management DB 5006, and a quality management DB 5007.

The transmission and receiving section 51 transmits and receives various data (or information) to and from another terminal, an apparatus, and a system via the communication network 2.

The terminal authentication section 52 performs terminal authentication by determining whether the same terminal ID and password are managed in a terminal authentication management table by searching the terminal authentication management DB 5002 of the storage 5000 by using the terminal ID and the password, which are included in the log-in request information received via the transmission and receiving section 51, as search keys. Here, in place of the authentication using the password, a more complicated authentication method may be used. Here, the terminal ID is used so as to identify the terminal and the user of the terminal. Therefore, an ID stored in the terminal in advance or an ID input in the terminal by the user may be used.

The state management section 53 manages the operating status of the request source terminal that transmits the log-in request. To that end, the state management section 53 stores and manages the terminal ID of the request source terminal in association with the operating status of the request source terminal, date and time when the log-in request information is received by the transmission management system 50, and the IP address of the request source terminal in a terminal management table of the terminal management DB 5003.

The terminal extraction section 54 extracts the terminal ID by searching a destination list management table of the destination list management DB 5004 by using the terminal ID of the request source terminal that transmits the log-in request as a key and reading the terminal ID of a destination terminal candidate that may communicate with the request source terminal.

The terminal state acquisition section 55 searches a terminal management table of the terminal management DB 5003 by using the terminal ID of the destination terminal candidate extracted by the terminal extraction section 54 as a key, and reads the operating status of the terminal ID extracted by the terminal extraction section 54.

The primary narrowing section 56 performs a primary narrowing process which is performed before the final narrowing process to support the final narrowing process that finally selects one relay apparatus 30 from among a plurality of the relay apparatuses 30. Namely, the primary narrowing section 56 performs the primary narrowing process to select relay apparatuses 30 that relays communications between the request source terminal and the destination terminals based on the relay-apparatus management DB 5001, the terminal management DB 5003, and the priority level management DB 5006.

The session management section 57 stores and manages the session ID in association with the terminal ID of the request source terminal, and the terminal ID of the destination terminals.

The quality determination section 58 determines the image quality of the video data to be relayed by the relay apparatuses 30 by searching a quality management table of the quality management DB 5007 by using the delay time as a key, and extracting the image quality of the corresponding video data.

The store and readout processing section 59 performs processes of storing various data in the storage 5000 and reading out the various data stored in the storage 5000.

The delay time management section 60 extracts the corresponding terminal ID by searching the terminal management table of the terminal management DB 5003 by using the IP address of the destination terminal, and stores and manages the delay time, which is indicated in the relay information, into a field part of the delay time in the record in which the extracted terminal ID is included in the session management table of the session management DB 5005.

The relay apparatus 30 includes a transmission and receiving section 31, a status detection section 32, a data quality checking (determination) section 33, a changed quality management section 34, a data quality change section 35, a store and readout processing section 39, and a storage 3000. The storage 3000 includes a change quality management DB (Data Base) 3001.

The transmission and receiving section 31 transmits and receives various data (or information) to and from another terminal, an apparatus, or a system via the communication network 2.

The status detection section 32 detects the operating status of the relay apparatus 30. As the operating status herein, there are an "on-line" status, an "off-line" status, a "communicating" status, and a "temporarily interrupted" status.

The data quality checking section 33 checks (determines) the image quality of the video data to be relayed by searching the change quality management DB 3001 by using the IP address of the destination terminal as a key, and extracting the image quality of the corresponding video data to be relayed.

The changed quality management section 34 changes the contents of the change quality management DB 3001 based on the quality information transmitted from the transmission management system 50. For example, while a remote conference is being performed by transmitting and receiving the high-quality video data between the request source terminal having the terminal ID "01aa" ("terminal 10aa") and the destination terminal having the terminal ID "01db" ("terminal 10db"), when a delay in receiving video data occurs at the destination terminal ("terminal 10db") due to, for example, another remote conference that is started between the other request source terminal ("terminal 10bb") and the other destination terminal ("terminal 10ca") via the communication network 2, the relay apparatus 30 changes (degrades) the image quality of the video data having been relayed so far from high-quality to middle-quality. In such a case, the contents of the change quality management DB 3001 are changed so that the image quality of the video data having been relayed by the relay apparatus 30 is changed from high-quality to middle-quality based on the quality information indicating the "middle-quality".

The data quality change section 35 changes the image quality of the video data transmitted from a transmission source terminal based on the changed contents of the change quality management DB 3001.

The store and readout processing section 39 performs processes of storing various data in the storage 3000 and reading out the various data stored in the storage 3000.

Basic Operations

FIGS. 4A, 4B schematically show statuses of transmitting and receiving video data, voice data and various management information in the transmission system 1. FIG. 4A shows a status where a normal remote conference is performed. FIG. 4B shows a loop-back status when a conference is held in a single site.

In FIG. 4A, the terminal serving as a request source that requests starting a remote conference is denoted as the "request source terminal", and the terminal serving as a request destination (relay destination) is denoted as the "destination terminal".

In the transmission system 1, a management information session "sei" is established to transmit and receive various management information between the "request source terminal" and the "destination terminal" via the transmission management system 50. In addition, four sessions are established between the "request source terminal" and the "destination terminal" via the relay apparatus 30 to transmit and receive four types of data which are the video data having high resolution, the video data having middle resolution, the video data having low resolution, and voice data. Here, those four sessions are collectively indicated as a video voice data session "sed". Here, it should be noted that this configuration is an example only. Namely, it is not always necessary to classify the sessions of video data into three categories. For example, the video data may be classified in one, two, or four or more categories.

The configuration in FIG. 4B differs from that in FIG. 4A in that the terminal of the "request source terminal" is the same as the terminal of the "destination terminal".

In the transmission system 1, the management information session "sei" is established via the transmission management system 50 and the video voice data session "sed" is established via the relay apparatus 30 to transmit and receive four types of data which are the video data having different resolutions and voice data. By doing this, it becomes possible for the same terminal to transmit and receive the video data and the voice data.

First Embodiment

Figure 5:
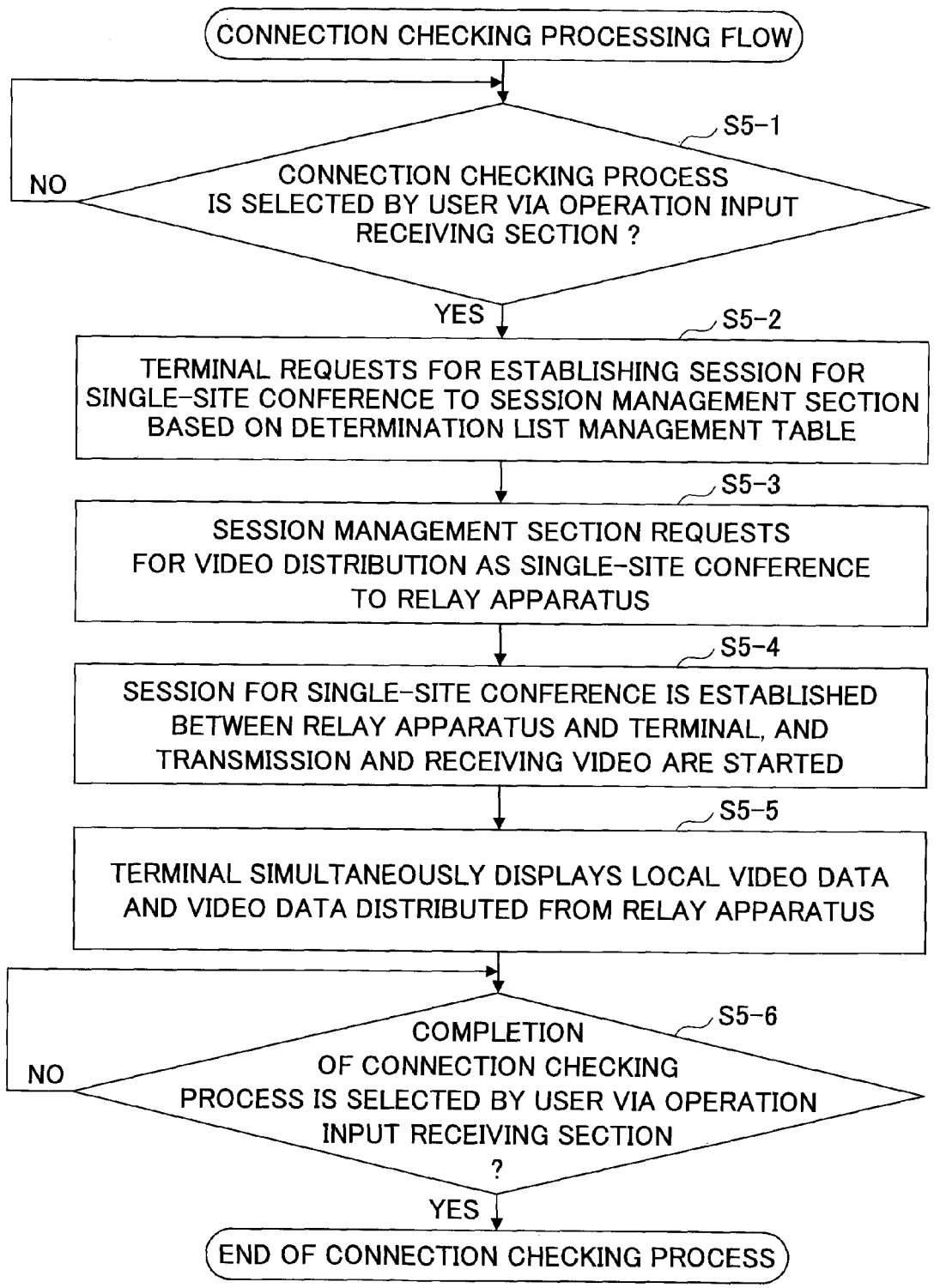
FIG. 5 is a flowchart showing an example connection checking process according to a first embodiment.

FIG. 5 is a flowchart of an example connection checking process according to a first embodiment.

In FIG. 5, when the transmission terminal 10 is started up in on-line mode and the connection checking process is selected by a user via the operation input receiving section 12 (YES in step S5-1), the connection checking process is started. Specifically, the display control section 17 displays a button to start the connection checking process to prompt the user to select the button to start the connection checking process.

The transmission terminal 10 refers to the destination list management table (details of this table is described below), and sends a request for establishing the session of a single-site conference to the session management section 57 of the transmission management system 50 (Step S5-2). Here, the "single-site conference" refers to a state where a conference room is virtually formed by a single transmission terminal 10 (i.e., a state where conference is performed using only one transmission terminal 10), and the state is realized by setting the terminal ID of the request source to be the same as the terminal ID of the destination and sending the request for establishing the session. The transmission terminal 10 where the session of the single-site conference is established will receive the loop-back video data transmitted from the same transmission terminal 10 via the relay apparatus 30.

Figure 6:
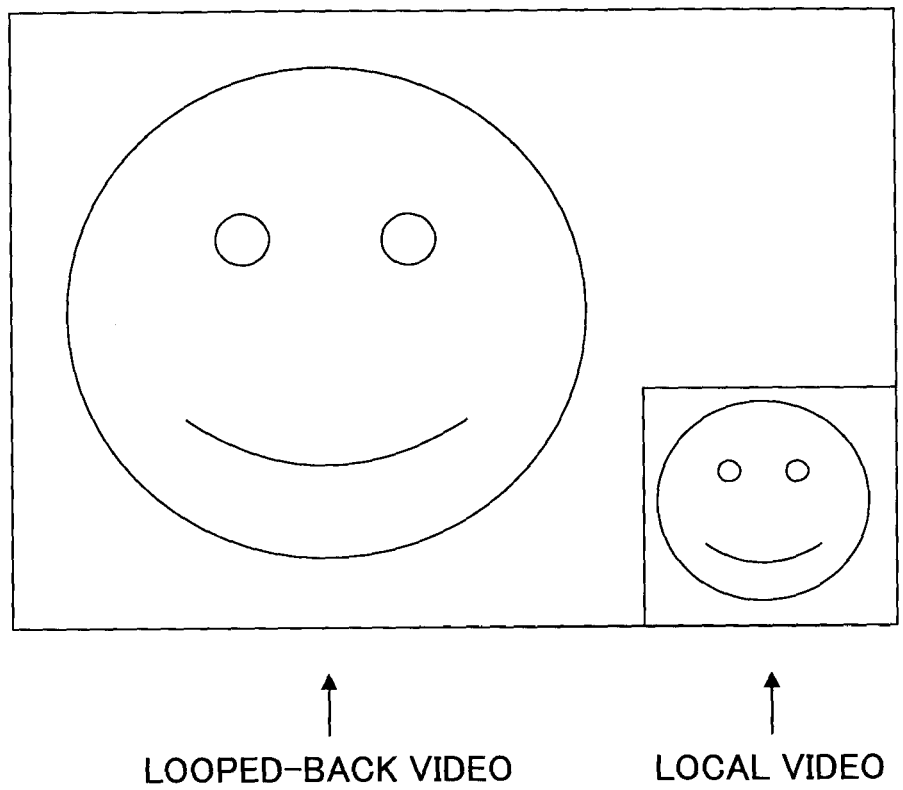
FIG. 6 is a drawing showing an example screen of the connection checking process.

FIG. 6 shows an example display on the transmission terminal 10, in which a local video is displayed in a small area on the right lower side, and a loop-back video is displayed in a large area which is the rest of the small area.

Referring back to FIG. 5, the session management section 57 of the transmission management system 50 sends a request for a video distribution as the single-site conference to the relay apparatus 30 (step S5-3). After that, a session for the single-site conference is established between the relay apparatus 30 and the transmission terminal 10, and the transmission and receiving the video data are started (step S5-4). In this case, the transmitted video from the transmission terminal 10 is looped back to the same transmission terminal 10 in real time.

On the transmission terminal 10 side, the local video which is not transmitted via the relay apparatus 30 and the video distributed from the relay apparatus 30 are simultaneously displayed (step S5-5). By doing this, it becomes possible to perform a diagnosis on the function of the camera with a single terminal and the network between the transmission terminal 10 and the relay apparatus 30 as well.

After that, when the completion of the connection checking process is selected by the user via the operation input receiving section 12 (YES in step S5-6), the connection checking process is terminated.

Figure 7:
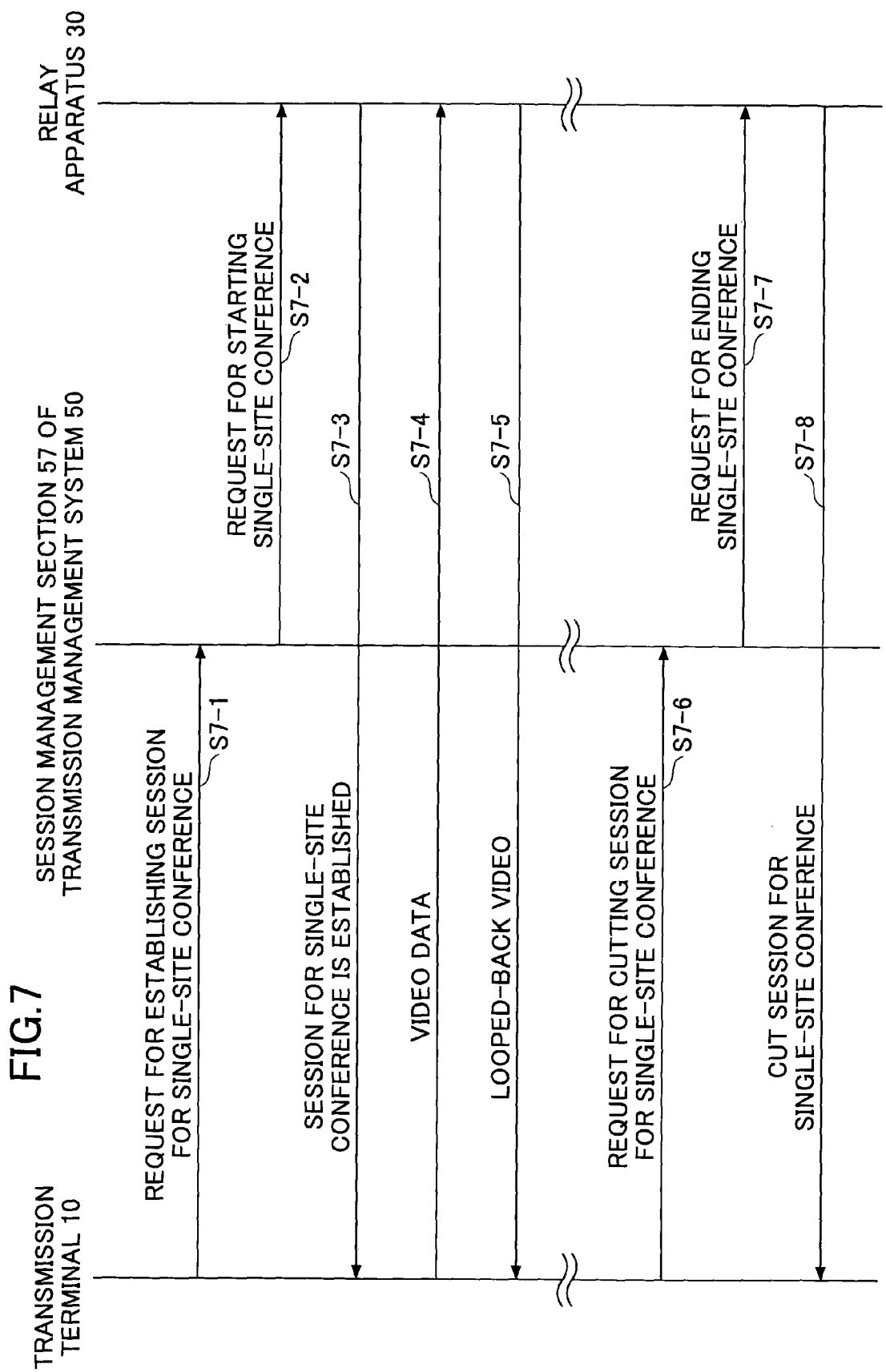
FIG. 7 is an example sequence diagram showing establishment of a session for the connection checking process and a loopback of an image.

FIG. 7 is a sequence diagram showing an example processes of establishing the session for the connection checking process and looping back the video.

In FIG. 7, when the transmission terminal 10 sends a request for establishing the session for the single-site conference to the session management section 57 of the transmission management system 50 (step S7-1), the session management section 57 sends a request for starting the single-site conference to the relay apparatus 30 (step S7-2). The relay apparatus 30 gives a notice of the establishment of the session for the single-site conference to the transmission terminal 10 (step S7-3).

The transmission terminal 10 transmits video (video data) to the relay apparatus 30 (step S7-4). The relay apparatus 30 loops back and transmits the video to the transmission terminal 10 (step S7-5).

After that, when the transmission terminal 10 sends a request for terminating (cutting) the session for the single-site conference to the session management section 57 of the transmission management system 50 (step S7-6), the session management section 57 sends a request for terminating the single-site conference to the relay apparatus 30 (step S7-7). The relay apparatus 30 gives a notice of the termination of the session for the single-site conference to the transmission terminal 10 (step S7-8).

FIGS. 8A-8E show examples operating screens for starting the connection checking.

In FIGS. 8A-8E, there are four display patterns A through D as the screens to start the connection checking.

In display pattern A, the screen in FIG. 8A is transited to the screen in FIG. 8C. FIG. 8A shows a connection checking selection screen displaying a list of the destinations in a normal remote conference. When the "start" button for the connection checking mode (process) on the connection checking selection screen is selected, a connection checking start screen as shown in FIG. 8C is displayed. The connection checking start screen displays a list of the destinations including the transmission terminal 10 which is the "request source terminal" as well. By selecting the transmission terminal 10 in the list of the destinations, the connection checking process is started.

In display pattern B, the screen in FIG. 8A is transited to the screen in FIG. 8D. FIG. 8A shows the connection checking selection screen displaying the list of the destinations in a normal remote conference. When the "start" button for the connection checking mode on the connection checking selection screen is selected, a connection checking start screen as shown in FIG. 8D is displayed. The connection checking start screen displays only the transmission terminal 10 in the list of destinations. By selecting the transmission terminal 10 in the list of the destinations, the connection checking process is started.

In display pattern C, the screen in FIG. 8B is transited to the screen in FIG. 8D. FIG. 8B shows a connection checking selection screen displaying the list of selectable functions. When the "connection checking" button in the connection checking selection screen is selected, the connection checking start screen as shown in FIG. 8D is displayed. The connection checking start screen displays only the destination of the transmission terminal 10 which is the "request source terminal" as well. By selecting the transmission terminal 10 in the list, the connection checking process is started.

In display pattern D, the screen in FIG. 8B is transited to the screen in FIG. 8E. FIG. 8B shows the connection checking selection screen displaying the list of selectable functions. When the "connection checking" button in the connection checking selection screen is selected, a connection checking start screen as shown in FIG. 8E is displayed. The connection checking start screen displays an outline of the connection checking. By selecting the "start" button, the connection checking process is started.

FIGS. 9A-9D show examples of the destination list management table to be used when the connection checking process is started.

FIG. 9A shows a normal destination list table to be referred to when a normal remote conference is started. In the normal destination list table, the terminal ID of the request source terminal is associated with the terminal IDs of the destination terminals. In a normal remote conference, it is not necessary for a transmission terminal to connect to the same transmission terminal. Therefore, the terminal ID of the request source terminal is not included in the terminal IDs of the destination terminals.

FIG. 9B shows a connection checking dedicated table. In the connection checking dedicated table, the same terminal ID as that of the request source terminal is included as the terminal ID of the destination terminal.

FIG. 9C shows a connection checking terminal ID added table. In the connection checking terminal ID added table, the terminal ID of the request source terminal is included in the terminal IDs of the destination terminals associated with the request source terminal.

FIG. 9D shows a combined-type table. In the combined-type table, the terminal ID of the request source terminal is associated with both the terminal IDs of the destination terminals to be used for a normal reference conference and the terminal ID of the request source terminal as the destination in the connection checking in separate fields.

In the following, each process of the display patterns shown in FIGS. 8A-8C is described.

Display Pattern A:

In display pattern A, the normal destination list table in FIG. 9A and the connection checking terminal ID added table in FIG. 9C are used. However, in place of this combination, the normal destination list table in FIG. 9A and the connection checking dedicated table in FIG. 9B are used, the combined-type table in FIG. 9D may be used, so as to generate the connection checking terminal ID added table in FIG. 9C. Those tables are stored in the destination list management DB 5004 of the storage 5000 in the transmission management system 50.

The display control section 17 of the transmission terminal 10 displays the connection checking selection screen in FIG. 8A including the list of the destinations in a normal remote conference based on the normal destination list table in FIG. 9A.

When a user selects the "start" button for the connection checking mode on the connection checking selection screen, the display control section 17 of the transmission terminal 10 displays the connection checking start screen in FIG. 8C based on the connection checking terminal ID added table in FIG. 9C. The connection checking start screen displays a list of the destinations including the transmission terminal 10 as well.

By selecting the transmission terminal 10 in the list of the destinations, the connection checking process is started, so that the session for the single-site conference is established where the transmission terminal 10 is set to the request source terminal and the destination terminal as well.

After that, when the user selects an "end" button for the connection checking mode, the display is returned to the connection checking selection screen in FIG. 8A.

Display Pattern B:

In display pattern B, the normal destination list table in FIG. 9A and the connection checking dedicated table in FIG. 9B are used, or the combined-type table in FIG. 9D is used. Those tables are stored in the destination list management DB 5004 of the storage 5000 in the transmission management system 50.

The display control section 17 of the transmission terminal 10 displays the connection checking selection screen in FIG. 8A including the list of the destinations in a normal remote conference based on the normal destination list table in FIG. 9A.

When a user selects the "start" button for the connection checking mode on the connection checking selection screen, the display control section 17 of the transmission terminal 10 displays the connection checking start screen in FIG. 8D based on the connection checking dedicated table in FIG. 9B. The connection checking start screen displays the list of destinations including only the transmission terminal 10 as the destination.

By selecting the transmission terminal 10 in the list of the destinations, the connection checking process is started, so that the session for the single-site conference is established where the transmission terminal 10 is set to the request source terminal and the destination terminal as well.

After that, when the user selects the "end" button for the connection checking mode, the display is returned to the connection checking selection screen in FIG. 8A.

Display Pattern C:

In display pattern C, the normal destination list table in FIG. 9A and the connection checking dedicated table in FIG. 9B are used, or the combined-type table in FIG. 9D is used. Those tables are stored in the destination list management DB 5004 of the storage 5000 in the transmission management system 50.

The display control section 17 of the transmission terminal 10 displays the connection checking selection screen displaying the list of selectable functions as shown in part (b) of FIG. 8B.

When a user selects the "connection checking" button, the display control section 17 of the transmission terminal 10 displays the connection checking start screen in FIG. 8D based on the connection checking dedicated table in FIG. 9B. The connection checking start screen displays the list of destinations including only the transmission terminal 10 as the destination.

By selecting the transmission terminal 10 on the connection checking start screen, the connection checking process is started, so that the session for the single-site conference is established where the transmission terminal 10 is set to the request source terminal and the destination terminal as well.

After that, when the user selects the "end" button, the display is returned to the connection checking selection screen in FIG. 8B.

Display Pattern D:

In display pattern D, the normal destination list table in FIG. 9A and the connection checking dedicated table in FIG. 9B are used, or the combined-type table in FIG. 9D is used. Those tables are stored in the destination list management DB 5004 of the storage 5000 in the transmission management system 50.

The display control section 17 of the transmission terminal 10 displays the connection checking selection screen displaying the list of selectable functions as shown in FIG. 8B.

When a user selects the "connection checking" button, the display control section 17 of the transmission terminal 10 displays the connection checking start screen as shown in FIG. 8E. The connection checking start screen displays an outline of the connection checking.

By selecting the "start" button on the connection checking start screen by a user, the connection checking process is started, so that the session for the single-site conference is established where the transmission terminal 10 is set to the request source terminal and the destination terminal as well (see the connection checking dedicated table in FIG. 9B).

After that, when the user selects the "end" button, the display is returned to the connection checking selection screen in FIG. 8B.

Second Embodiment

FIG. 10 is a flowchart of an example connection checking process according to a second embodiment. Here, a howling (acoustic feedback) phenomenon, which may occur due to loop-back voice in the connection checking process for the single-site conference, is prevented.

In FIG. 10, when the transmission terminal 10 is started up in on-line mode and the connection checking process is selected by a user via the operation input receiving section 12 (YES in step S10-1), the connection checking process is started. Specifically, the display control section 17 displays a button to start the connection checking and the user selects the button, so that the connection checking process is started.

First, the transmission terminal 10 mutes (cuts voice) the voice input by the voice input section 15a (step S10-2).

Next, the transmission terminal 10 refers to the destination list management table (details are described below), and sends a request for establishing the session for the single-site conference to the session management section 57 of the transmission management system 50 (step S10-3). Here, the "single-site conference" refers to the state where a conference room is virtually formed by a single transmission terminal 10, and is realized by requesting for establishing a session under a condition that the terminal ID of the request source terminal is the same as the terminal ID of the destination terminal. The transmission terminal 10 using the session for the single-site conference receives loop-back video from the transmission terminal 10 via the relay apparatus 30. FIG. 6 shows a display sample in this case, in which a local video is displayed in a small area on the right lower side, and a loop-back video is displayed in a large area which is the rest of the small area.

Referring back to FIG. 10, the session management section 57 of the transmission management system 50 sends a request for a video distribution as the single-site conference to the relay apparatus 30 (step S10-4). After that, a session for the single-site conference is established between the relay apparatus 30 and the transmission terminal 10, and the transmission and receiving the video data are started (step S10-5). In this case, the transmitted video from the transmission terminal 10 is looped back (returned) to the same transmission terminal 10 in real time.

On the transmission terminal 10 side, the local video which is not transmitted via the relay apparatus 30 and the video distributed from the relay apparatus 30 are simultaneously displayed (step S10-6). By doing this, it becomes possible to perform a diagnosis on the function of the camera with a single terminal and the network between the transmission terminal 10 and the relay apparatus 30 as well.

After that, when the completion of the connection checking process is selected by the user via the operation input receiving section 12 (YES in step S10-7), the transmission terminal 10 un-mutes the voice input by the voice input section 15a (step S10-8) and the connection checking process is terminated.

Third Embodiment

Figure 11:
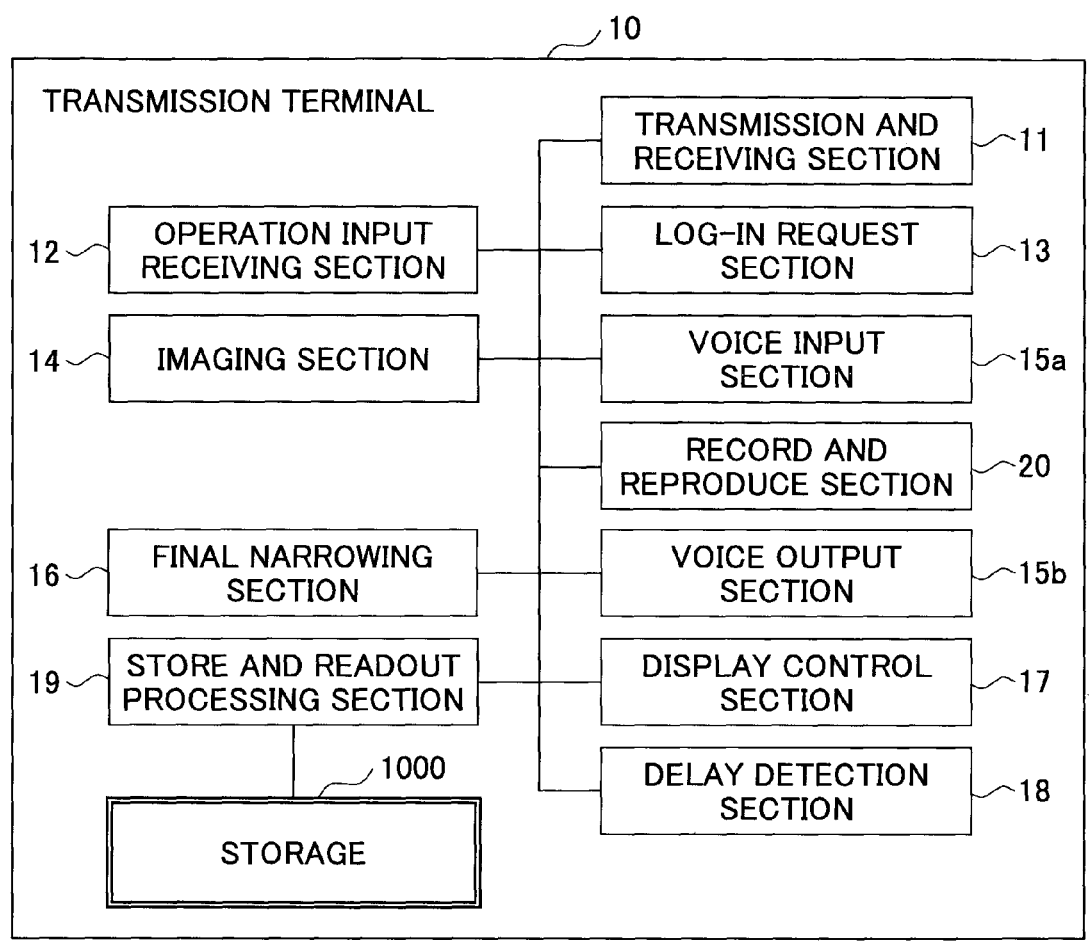
FIG. 11 is a drawing showing an example functional configuration of the transmission terminal according to a third embodiment.

FIG. 11 shows an example functional configuration of the transmission terminal 10 according to a third embodiment. Here, besides the connection checking using video, voice checking can be performed.

In FIG. 11, the transmission terminal 10 temporarily further includes a record and reproduce section 20 that records voice (i.e., stores the voice data in the storage 1000) which is input by the voice input section 15a, and reproduces the recorded voice (i.e., reads out the voice data from the storage 1000) to output the recorded voice data to the transmission and receiving section 11 (data reproducing) or the voice output section 15b (local reproducing).

Figure 12:
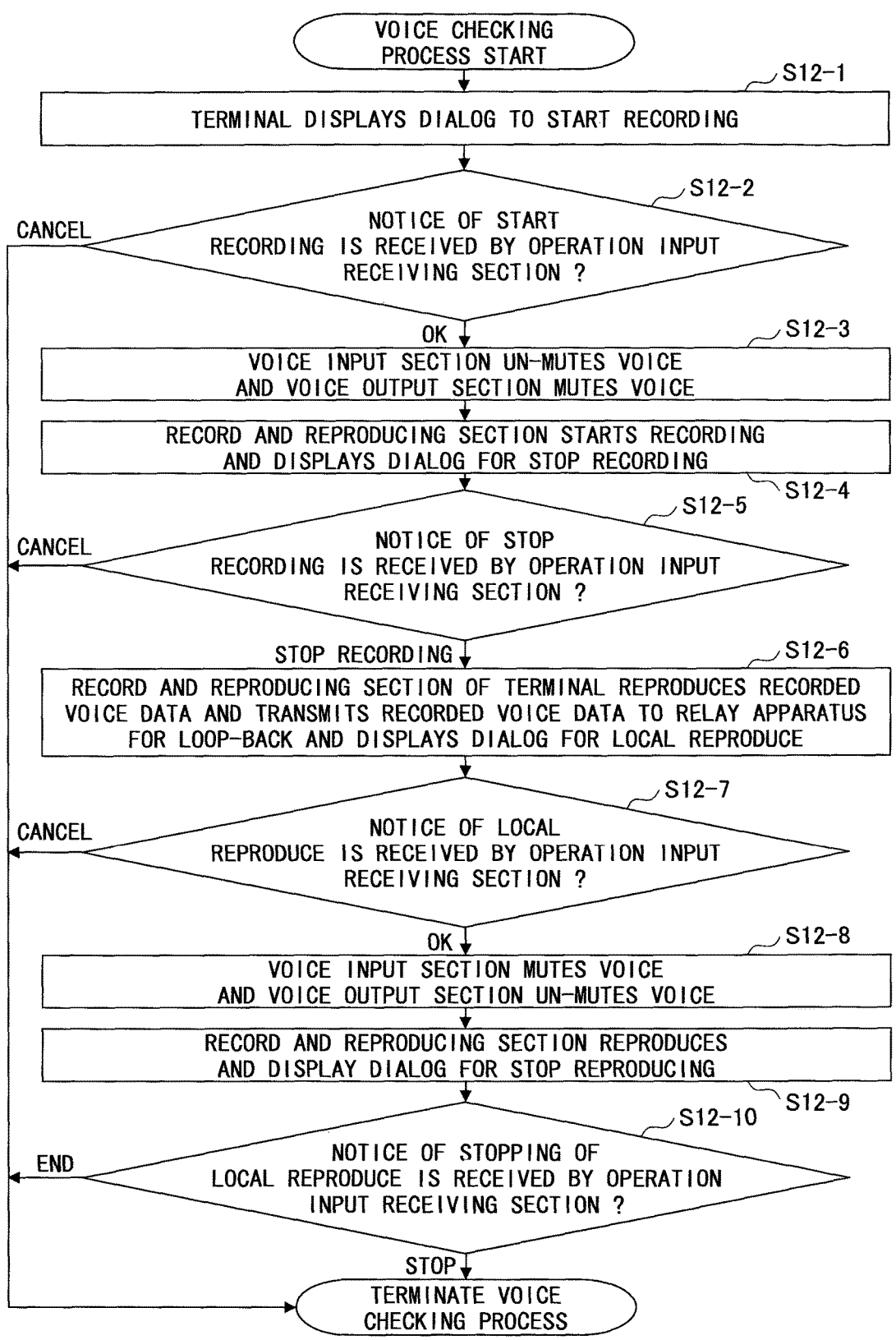
FIG. 12 is a flowchart of an example voice checking process.

FIG. 12 is a flowchart showing an example voice checking process. This process may be performed in parallel with the connection checking process of FIG. 10 or may be performed separately from the connection checking process.

Figure 13A:
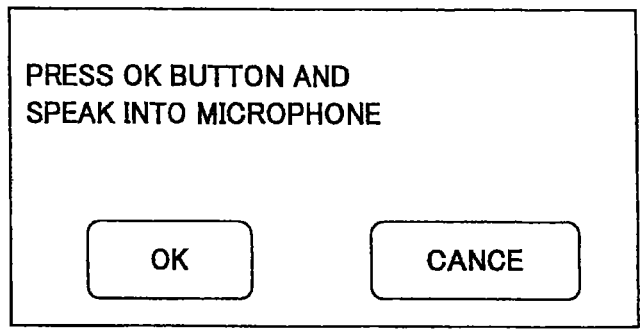
FIGS. 13A-13D are drawings showing an example screen in the voice checking process.

In FIG. 12, the display control section 17 of the transmission terminal 10 displays a dialog for starting recording voice (step S12-1). For example, the display control section 17 displays a dialog as shown in FIG. 13A.

Referring back to FIG. 12, when the operation input receiving section 12 of the transmission terminal 10 receives a notice of record starting (OK in step S12-2), the voice input section 15a un-mutes voice and the voice output section 15b mutes voice (step S12-3).

Figure 13B:
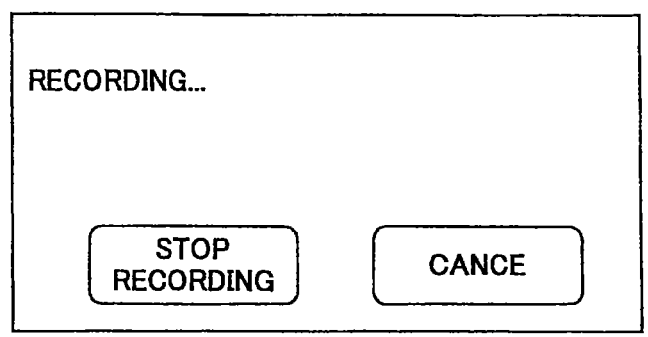

Next, the record and reproduce section 20 of the transmission terminal 10 starts recording voice data and displays a dialog for stopping recording (step S12-4). For example, the operation input receiving section 12 displays a dialog as shown in FIG. 13B.

Figure 13C:
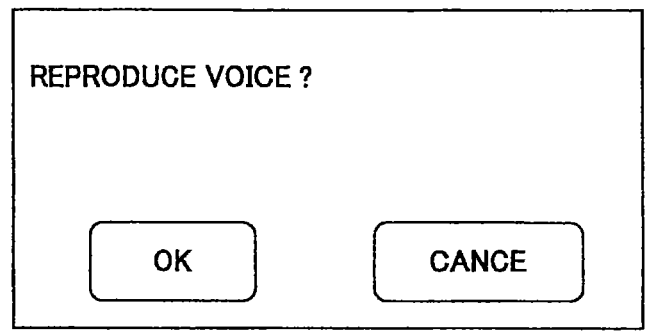

Referring back to FIG. 12, when the operation input receiving section 12 of the transmission terminal 10 receives a notice of stop recording (stop recording in step S12-5), the record and reproduce section 20 reproduces and transmits the recorded voice to the relay apparatus 30 to loop back and displays a dialog for local reproducing (step S12-6). For example, the operation input receiving section 12 displays a dialog as shown in FIG. 13C.

Referring back to FIG. 12, when the operation input receiving section 12 of the transmission terminal 10 receives a notice of local reproducing (OK in step S12-7), the voice input section 15a mutes voice and the voice output section 15b un-mutes voice (step S12-8).

Figure 13D:
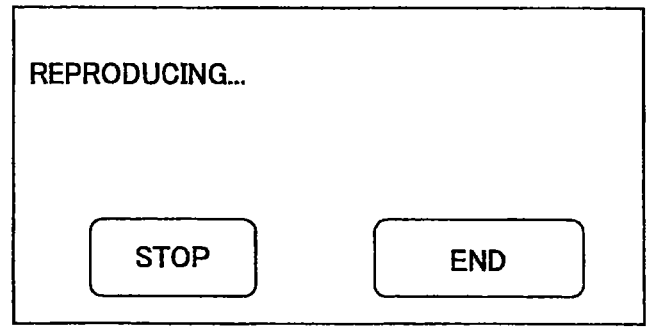

Next, the record and reproduce section 20 of the transmission terminal 10 performs local reproducing and displays a dialog for stopping local reproducing (step S12-9). For example, the operation input receiving section 12 displays a dialog as shown in FIG. 13D.

Referring back to FIG. 12, when the operation input receiving section 12 of the transmission terminal 10 receives a notice of stopping local reproducing (stop in step S12-10), the voice checking process is terminated.

Further, if a notice of canceling is received when the notice of record starting is received (cancel in step S12-2), when the notice of stopping recording is received (cancel in step S12-5), or when the notice of stopping local reproducing is received (cancel in step S12-7), or if a notice of ending is received (end in step S12-10), the voice checking process is terminated.

As described above, a case is described where a user inputs and records the user's voice. However, predetermined recorded data for testing stored in the storage 1000 in advance may be reproduced. In this case, it is not necessary to mute voice by the voice input section 15a and the voice output section 15b. However, it is not possible to check whether the microphone (including the external microphone) work correctly.

Further, a marker which can be identified as a signal may be inserted in the recorded data (including a case where the recorded data are recorded by the user and a case where the recorded data are stored in the storage 1000 in advance).

Then, the timing of the marker when the recorded data are transmitted is compared with the timing of the marker when the recorded data are received, and the delay of the voice is measured and may be displayed.

Fourth Embodiment

Figure 14:
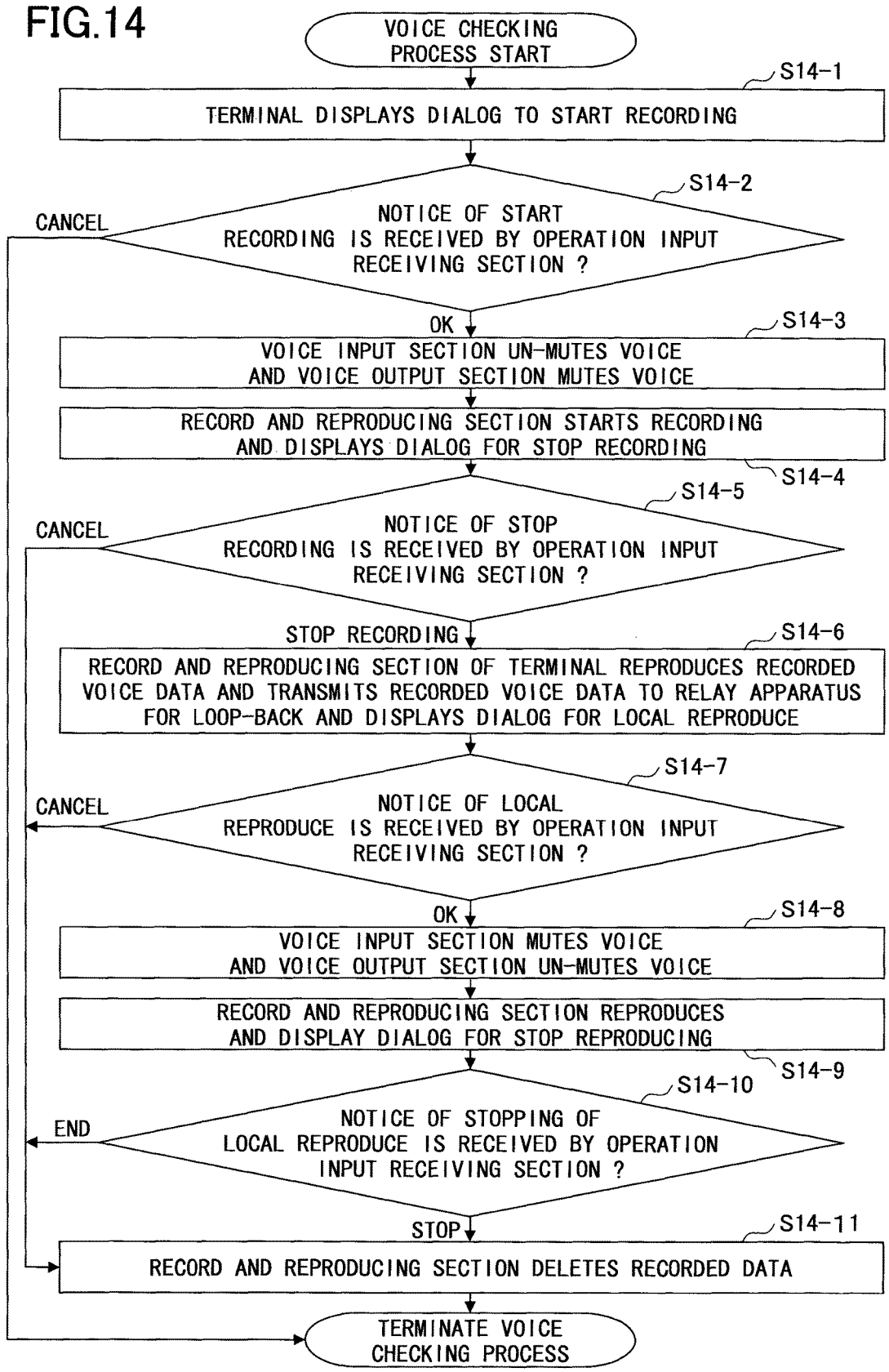
FIG. 14 is a flowchart showing an example voice checking process according to a fourth embodiment.

FIG. 14 is a flowchart of an example voice checking process according to a fourth embodiment, where the recorded voice data are deleted when the voice checking process ends. By doing this, the privacy is protected.

In FIG. 14, the display control section 17 of the transmission terminal 10 displays a dialog for start recording voice (step S14-1).

Next, when the operation input receiving section 12 of the transmission terminal 10 receives a notice of recording starting (OK in step S14-2), the voice input section 15a un-mutes voice and the voice output section 15b mutes voice (step S14-3).

Next, the record and reproduce section 20 of the transmission terminal 10 starts recording voice data and displays a dialog for stop recording (step S14-4).

Next, when the operation input receiving section 12 of the transmission terminal 10 receives a notice of stopping recording (stop recording in step S14-5), the record and reproduce section 20 reproduces and transmits the recorded voice data to the relay apparatus 30 to loop back and displays a dialog for local reproducing (step S14-6).

Next, when the operation input receiving section 12 of the transmission terminal 10 receives a notice of local reproducing (OK in step S14-7), the voice input section 15a mutes voice and the voice output section 15b un-mutes voice (step S14-8).

Next, the record and reproduce section 20 of the transmission terminal 10 performs local reproducing and displays a dialog for stopping local reproducing (step S14-9).

Next, when the operation input receiving section 12 of the transmission terminal 10 receives a notice of stopping local reproducing (stop in step S14-10), the record and reproduce section 20 deletes the recorded data (step S14-11) and the voice checking process is terminated.

Further, if a notice of canceling is received when the notice of recording starting is received (cancel in step S14-2), the voice checking process is terminated.

Further, if a notice of canceling is received when the notice of stopping recording is received (cancel in step S14-5), or when the notice of stop local reproducing is received (cancel in step S14-7), or if a notice of ending is received (end in step S14-10), the recorded data are deleted (step S14-11) and the voice checking process is terminated.

Review

As described above, according to embodiments, the present invention has the following advantages (effects).

(1) In the connection checking process, the video data and the voice data are looped back in the video distribution server. By doing this, it becomes possible to perform connection checking in the same network configuration as that used in an actual conference. Further, the transmission terminal can display both "local video" which is captured by a camera and displayed in the terminal and "loop-back video" which is distributed by the video distribution server, so as to be compared with each other to check the network delay.

(2) It becomes possible to prevent the occurrence of howling by muting voice in the voice input section in the connection checking process.

(3) As a voice check, it is possible to record voice data by the terminal and the loop-back reproduced recorded data can be compared with the locally reproduced recorded data so as to check voice degradation.

(4) The recorded data can be deleted when the voice checking process is terminated, so that it becomes possible to protect privacy in an environment where plural users can use the terminal.

Although the invention has been described with respect to specific embodiments for a complete and clear disclosure, the appended claims are not to be thus limited but are to be construed as embodying all modifications and alternative constructions that may occur to one skilled in the art that fairly fall within the basic teachings herein set forth.

The present application is based on and claims the benefit of priority of Japanese Patent Application No. 2012-240242 filed Oct. 31, 2012, the entire contents of which are hereby incorporated herein by reference.

DESCRIPTION OF THE REFERENCE NUMERALS

1: TRANSMISSION SYSTEM
10: TRANSMISSION TERMINAL
11: TRANSMISSION AND RECEIVING SECTION
12: OPERATION INPUT RECEIVING SECTION
13: LOG-IN REQUEST SECTION
14: IMAGING SECTION
15a: VOICE INPUT SECTION
15b: VOICE OUTPUT SECTION
16: FINAL NARROWING SECTION
17: DISPLAY CONTROL SECTION
18: DELAY DETECTION SECTION
19: STORE AND READOUT PROCESSING SECTION
20: RECORD AND REPRODUCE SECTION
1000: STORAGE
30: RELAY APPARATUS
31: TRANSMISSION AND RECEIVING SECTION
32: STATUS DETECTION SECTION
33: DATA QUALITY CHECKING SECTION
34: CHANGED QUALITY MANAGEMENT SECTION
35: DATA QUALITY CHANGE SECTION
39: STORE AND READOUT PROCESSING SECTION
3000: STORAGE
3001: CHANGE QUALITY MANAGEMENT DB
50: TRANSMISSION MANAGEMENT SYSTEM
51: TRANSMISSION AND RECEIVING SECTION
52: TERMINAL AUTHENTICATION SECTION
53: STATE MANAGEMENT SECTION
54: TERMINAL EXTRACTION SECTION
55: TERMINAL STATE ACQUISITION SECTION
56: PRIMARY NARROWING SECTION
57: SESSION MANAGEMENT SECTION
58: QUALITY DETERMINATION SECTION
59: STORE AND READOUT PROCESSING SECTION
60: DELAY TIME MANAGEMENT SECTION
5000: STORAGE
5001: RELAY APPARATUS MANAGEMENT DB
5002: TERMINAL AUTHENTICATION MANAGEMENT DB
5003: TERMINAL MANAGEMENT DB
5004: DESTINATION LIST MANAGEMENT DB
5005: SESSION MANAGEMENT DB
5006: PRIORITY LEVEL MANAGEMENT DB
5007: QUALITY MANAGEMENT DB
90: PROGRAM PROVIDING SYSTEM
100: MAINTENANCE SYSTEM

PRIOR ART DOCUMENT

Patent Document

[Patent Document 1] Japanese Laid-Open Patent Application No. H07-162825

The invention claimed is:

1. A transmission system comprising:
a transmission terminal configured to locally reproduce video data and voice data and transmit and receive the video data and voice data via a network;
a relay apparatus configured to transmit the video data and the voice data transmitted from the transmission terminal to another transmission terminal or the transmission terminal that has transmitted the video data and voice data; and
a transmission management apparatus configured to manage a session for a plurality of transmission terminals or a single transmission terminal,
wherein the transmission terminal is configured to send a request for establishing a session for a single site to the relay apparatus via the transmission management apparatus, and the relay apparatus is configured to establish the session for the single site related to the transmission terminal in response to the request from the transmission terminal as a request source so that a connection check process is performed on the transmission terminal within the single site only,
wherein the transmission terminal is configured to mute voice input when the connection check process is started and un-mute the voice input when the connection check process is terminated.

2. The transmission system according to claim 1,
wherein the transmission management apparatus includes a storage and is configured to store a destination list management table in the storage, the destination list management table including terminal ID of the transmission terminal as the request source in association with the terminal IDs of the transmission terminal and the other transmission terminal that can be a connecting destination, and
wherein the transmission terminal is configured to refer to the destination list management table and send a request for the session for the single site by designating the terminal ID of the transmission terminal as the request source and the destination.

3. The transmission system according to claim 1,
wherein within the single site, the transmission terminal is configured to simultaneously display local video and looped-back video from the relay apparatus so as to be compared with each other to check camera operations, image quality, and network delay.

4. The transmission system according to claim 1,
wherein the transmission terminal is configured to record input voice and reproduce and transmit the recorded input voice at predetermined timings, so that operations of a microphone and a speaker and voice quality can be checked by checking the voice data distributed from the relay apparatus.

5. The transmission system according to claim 4,
wherein the transmission terminal is configured to delete the recorded input voice data when the connection checking process is terminated.

6. A relay apparatus comprising:
a distribution interface configured to transmit video data and voice data, which are transmitted from a transmission terminal, to another transmission terminal or the transmission terminal that transmits the video data and the voice data as a transmission source, the transmission terminal being capable of locally reproducing the video data and the voice data and transmitting and receiving the video data and voice data via a network; and
a session establishing processor configured to establish a session for a single site for the transmission terminal as the transmission source upon receiving a request for establishing the session for the single site from the transmission terminal via a transmission management apparatus being capable of managing a session for a plurality of the transmission terminals or the transmission source transmission terminal, so that a connection check process can be performed on the transmission terminal within the single site only,
wherein the transmission terminal is configured to mute voice input when the connection check process is started and un-mute the voice input when the connection check process is terminated.

7. A transmission terminal comprising:
a transmission and receiving processor configured to locally reproduce video data and voice data and transmit and receive the video data and the voice data via a network; and
a session establishment request processor configured to send a request for establishing a session to a relay apparatus, which transmits the video data and the voice data transmitted from the transmission terminal to another transmission terminal or the transmission terminal that has transmitted the video data and voice data as transmission source, via a transmission management apparatus capable of managing a session for a plurality of the transmission terminals or the transmission source transmission terminal, so as to establish a session for a single site by sending the request for establishing a session for the single site to perform a connection check process within the single site only,
wherein the transmission terminal is configured to mute voice input when the connection check process is started and un-mute the voice input when the connection check process is terminated.

\* \* \* \* \*